(12) United States Patent
Ke

(10) Patent No.: US 11,068,177 B2
(45) Date of Patent: Jul. 20, 2021

(54) DATA STORAGE DEVICES AND DATA PROCESSING METHODS FOR SHORTENING TIME REQUIRED FOR A HOST DEVICE TO WAIT FOR INITIALIZATION OF THE DATA STORAGE DEVICE

(71) Applicant: Silicon Motion, Inc., Jhubei (TW)

(72) Inventor: Kuan-Yu Ke, Zhubei (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 16/661,289

(22) Filed: Oct. 23, 2019

(65) Prior Publication Data
US 2020/0142619 A1 May 7, 2020

(30) Foreign Application Priority Data
Nov. 6, 2018 (TW) .................. 107139284

(51) Int. Cl.
*G06F 3/06* (2006.01)
*G06F 13/16* (2006.01)
*G06F 12/1009* (2016.01)

(52) U.S. Cl.
CPC ............ *G06F 3/0631* (2013.01); *G06F 3/064* (2013.01); *G06F 3/0632* (2013.01); *G06F 3/0659* (2013.01); *G06F 3/0673* (2013.01); *G06F 12/1009* (2013.01); *G06F 13/1668* (2013.01); *G06F 2212/7201* (2013.01)

(58) Field of Classification Search
CPC .... G06F 3/0631; G06F 3/0632; G06F 3/0659; G06F 3/064; G06F 13/1668; G06F 12/1009; G06F 3/0673; G06F 2212/7201; G06F 11/004; G06F 11/07; G06F 3/0679; G06F 3/0619; G06F 3/0611;
(Continued)

(56) References Cited

U.S. PATENT DOCUMENTS

2006/0053246 A1 3/2006 Lee
2006/0282644 A1 12/2006 Wong
(Continued)

FOREIGN PATENT DOCUMENTS

CN 104021089 A 9/2014
CN 108351850 A 7/2018

*Primary Examiner* — Sean D Rossiter
(74) *Attorney, Agent, or Firm* — Winston Hsu

(57) ABSTRACT

A data storage device includes a memory device and a memory controller. The memory device includes multiple memory blocks. The memory blocks include multiple table blocks configured to store tables and multiple data blocks configured to store data. The memory controller is configured to receive a predefined command which is a command from a host device to instruct the memory controller to perform initialization of the data storage device. The initialization of the data storage device includes a plurality of processing procedures which include a first portion of processing procedures and a second portion of processing procedures. The memory controller is configured to perform the first portion of processing procedures in response to the predefined command. After the first portion of processing procedures has been finished, the memory controller is configured to notify the host device that the data storage device is ready.

16 Claims, 4 Drawing Sheets

(58) Field of Classification Search
CPC .... G06F 3/0658; G06F 3/0656; G06F 3/0683; G06F 2003/0691
See application file for complete search history.

(56) References Cited

U.S. PATENT DOCUMENTS

| | | | |
|---|---|---|---|
| 2015/0324283 A1* | 11/2015 | Lai | G11C 29/42 |
| | | | 714/764 |
| 2016/0162215 A1 | 6/2016 | Jayaraman | |
| 2016/0231932 A1 | 8/2016 | Falanga | |
| 2017/0177244 A1* | 6/2017 | Khochare | G06F 3/0619 |
| 2019/0129633 A1* | 5/2019 | Wang | G06F 3/0632 |
| 2019/0339888 A1* | 11/2019 | Sasidharan | G06F 13/4282 |

\* cited by examiner

DATA STORAGE DEVICES AND DATA PROCESSING METHODS FOR SHORTENING TIME REQUIRED FOR A HOST DEVICE TO WAIT FOR INITIALIZATION OF THE DATA STORAGE DEVICE

CROSS REFERENCE TO RELATED APPLICATIONS

This Application claims priority of Taiwan Patent Application No. 107139284, filed on Nov. 6, 2018, the entirety of which is incorporated by reference herein.

BACKGROUND OF THE INVENTION

Field of the Invention

The invention relates to a data storage device and a data processing method, and more particularly to a data storage device and a data processing method capable of effectively shortening the time required for a host device to wait for the initialization of the data storage device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

Generally, a data storage device needs to be initialized before it can be accessed by a host device. Therefore, the host device cannot access the data storage device until the data storage device is initialized and notifies the host device that it is ready. However, the important system information of the host device is stored in the data storage device. For example, the program codes and the parameters of the operating system (OS), the system setting data, the user related setting data, etc. are stored in the data storage device. Therefore, the host device has to wait for the data storage device to complete initialization, and then it accesses the data storage device to obtain the aforementioned important system information required for performing subsequent system initialization, such as initializing the peripheral devices, starting up the OS, etc.

In order to enable the host device to access the data storage device as soon as possible, so as to obtain the important system information required for performing initialization, a novel data processing method is proposed. The proposed data processing method effectively shortens the time required for the host device to wait for initialization of the data storage device. In this manner, the host device can access the data storage device faster than the conventional design.

BRIEF SUMMARY OF THE INVENTION

Data storage devices and data processing methods are provided. An exemplary embodiment of a data storage device comprises a memory controller and a memory device. The memory device comprises a plurality of memory blocks, and the memory blocks comprise a plurality of table blocks configured to store a plurality of tables and a plurality of data blocks configured to store data. The memory controller is coupled to the memory device and configured to access the memory device. The memory controller is configured to receive a predefined command which is a command to instruct the memory controller to perform initialization of the data storage device from a host device. The initialization of the data storage device comprises a plurality of processing procedures, and the processing procedures comprise a first portion of processing procedures and a second portion of processing procedures. The memory controller is configured to perform the first portion of processing procedures in response to the predefined command. After the first portion of processing procedures has been finished, the memory controller is configured to notify the host device that the data storage device is ready.

An exemplary embodiment of a data processing method for a data storage device, wherein the data storage device comprises a memory device and a memory controller, the memory device comprises a plurality of memory blocks, the memory blocks comprise a plurality of table blocks configured to store a plurality of tables and a plurality of data blocks configured to store data, the memory controller is coupled to the memory device and is configured to access the memory device, the method is performed by the memory controller and comprises: receiving a predefined command to instruct the memory controller to perform initialization of the data storage device from a host device, wherein the initialization of the data storage device comprises a plurality of processing procedures, and the processing procedures comprise a first portion of processing procedures and a second portion of processing procedures; performing the first portion of processing procedures in response to the predefined command; and notifying the host device that the data storage device is ready after the first portion of processing procedures has been finished.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
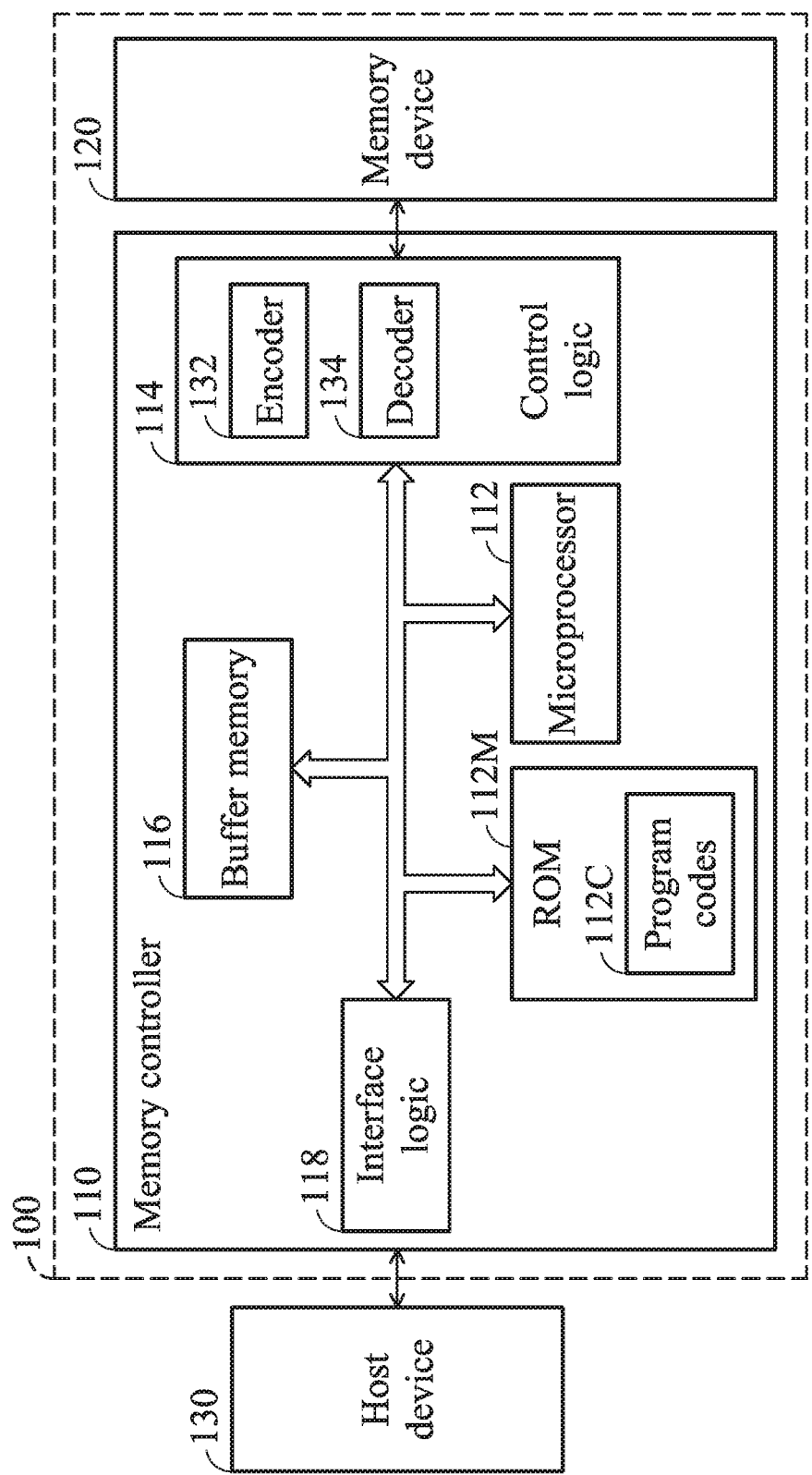
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, and the access unit of a write operation performed by the controller (e.g., the memory controller 110, through the execution of the program codes 112C by the microprocessor 112) on the memory device 120 may be one page.

In practice, the memory controller 110 may perform various control operations using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. The buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as a read command or a write command, to the data storage device 100, so as to access the data stored in the memory device 120, or the host device 130 may issue commands to further control or manage the data storage device 100.

According to an embodiment of the invention, the memory device 120 may comprise a plurality of memory blocks. The memory blocks may comprise a plurality of table blocks configured to store a plurality of tables and a plurality of data blocks configured to store data. In addition, according to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits of data, and the memory cell of the TLC memory block is configured to store three bits of data.

According to an embodiment of the invention, by considering the importance and the amount of data to be stored, the memory controller may flexibly select to use the SLC memory blocks, the MLC memory blocks or the TLC memory blocks as the aforementioned table blocks and data blocks. Therefore, in the embodiments of the invention, the mentioned table blocks and data blocks are not limited to any specific type of the SLC memory blocks, the MLC memory blocks and the TLC memory blocks.

According to an embodiment of the invention, each memory block may comprise a predetermined number of pages, where the page may be a logical page. Therefore, for the SLC memory block, the MLC memory block and the TLC memory block, the value of the predetermined number may be different. For example, the number of logical pages comprised in an MLC memory block may be double that comprised in an SLC memory block, the number of logical pages comprised in a TLC memory block may be triple that comprised in an SLC memory block.

As discussed above, the data storage device needs to be initialized before it can be accessed by the host device. Since the memory device 120 comprises a plurality of memory blocks, in the initialization of the data storage device, the memory controller 110 has to obtain the addresses at which the table blocks required for maintaining operations of the data storage device are stored in the memory device 120, and obtain the addresses at which the data blocks utilized for storing data are stored in the memory device 120. The memory controller 110 is further configured to establish one or more mapping tables for the data blocks before it can provide the access services for the host devices 130. Therefore, when the host device 130 has to initialize the overall system (for example, when the aforementioned electronic device is powered up, the host device 130 starts to perform the initialization for the electronic device system), the host device 130 will issue a predefined command to the data storage device 100, to instruct the memory controller 110 to perform initialization of the data storage device 100.

According to an embodiment of the invention, the initialization of the data storage device 100 may comprise a plurality of processing procedures. By performing these processing procedures, the memory controller 110 can identify which memory blocks are utilized as table blocks, which memory blocks are utilized as data blocks, which memory block is a closed data block that have been fully written with data, which memory block is an opened data block that have not been fully written with data, and may further establish a mapping table corresponding to one data block, so as to record which logical page is data written in each physical page of a memory block directed to. In addition, the memory controller 110 may further repair the memory blocks that have not been fully written with data, so as to stabilize the data that has been written in the memory blocks and to make sure that the remaining empty pages in the memory blocks can still be safely used (that is, no further error will occur in the data written in the memory blocks subsequently).

According to an embodiment of the invention, the processing procedures comprised in the initialization of the data storage device 100 may be divided into a first portion of processing procedures and a second portion of processing procedures. That is, the processing procedures of the initialization as discussed above may be regarded as comprising two portions. According to an embodiment of the invention, in response to the predefined command to instruct the memory controller 110 to perform the initialization, the memory controller 110 may first perform the first portion of processing procedures, and after the first portion of processing procedures has been finished, the memory controller 110 is configured to directly notify the host device 130 that the data storage device 100 is ready.

According to an embodiment of the invention, the data storage device 100 may be an eMMC device. In this embodiment, the memory controller 110 may notify the host device 130 that the data storage device 100 is ready by responding to the host device 130 with a ready message Ready. For example, the host device 130 may transmit a predefined command CMD1 to the data storage device 100 to instruct the memory controller 130 to perform the initialization of the data storage device 100. In response to the reception of the predefined command CMD1, the memory controller 110 may first execute the first portion of processing procedures, and after the first portion of processing procedures has been finished, the memory controller 110 may directly transmit a ready message Ready to the host device 130 to notify the host device 130 that the data storage device 100 is ready.

According to another embodiment of the invention, the data storage device 100 may be an UFS device. In this embodiment, the memory controller 110 may notify the host device 130 that the data storage device 100 is ready by setting the value of the flag to a predefined value. For example, the host device 130 may transmit a predefined command Set_flag to the data storage device 100, so as to set the value of the flag to another predefined value, for example, the bit '1'. The host device 130 sets the value of the flag to bit '1' to instruct the memory controller 130 to perform initialization of the data storage device 100. In response to the reception of the predefined command Set_flag, the memory controller 110 may first execute the first portion of processing procedures, and after the first portion of processing procedures has been finished, the memory controller 110 may directly set the value of the flag to the predefined value, for example, the bit '0', so as to notify the host device 130 that the data storage device 100 is ready.

After the host device 130 sends the predefined command Set_flag, the host device 130 will keep polling the value of the flag. For example, the host device 130 may query the current value of the flag by issuing a read flag command Read_flag to the data storage device 100. The host device 130 knows that the data storage device 100 is ready when it detects (for example, based on the reply from the memory controller 110) that the value of this flag is set to the bit '0'.

According to an embodiment of the invention, when the host device 130 is notified that the data storage device 100 is ready, the host device 130 may start to access the data stored in the memory device 120. That is, the host device 130 may start to issue an access command, for example, a read command, to the data storage device 100.

According to an embodiment of the invention, after notifying the host device 130 that the data storage device 100 is ready, the memory controller 110 is further configured to determine whether the host device 130 is idle. When the host device 130 is idle, the memory controller 110 is configured to perform the second portion of processing procedures in the background, so as to complete the initialization of the data storage device 100.

In other words, in the embodiments of the invention, after the memory controller 110 has finished the first portion of processing procedures, the memory controller 110 may not perform the second portion of processing procedures right away. Instead, the memory controller 110 may first notify the host device 130 that the data storage device 100 is ready. After notifying the host device 130 that the data storage device 100 is ready, the memory controller 110 may perform the second portion of processing procedures in the background when the host device 130 is idle, so as to finish the whole processing procedures of the initialization of the data storage device 100. Therefore, according to the embodiment of the invention, the memory controller 110 may notify the host device 130 that the data storage device 100 is ready early before performing the second portion of processing procedures or before the second portion of processing procedures has been finished (that is, before the initialization of the data storage device is complete or before the overall processing procedures of the initialization has been finished) . In this manner, as compared to the conventional design, the time required for the host device 130 to wait for the initialization of the data storage device 100 (that is, the time that the host device 130 cannot access the host device 100) can be greatly shortened. Therefore, the host device 130 is able to access the data storage device 100 much earlier than the conventional design.

Figure 2:
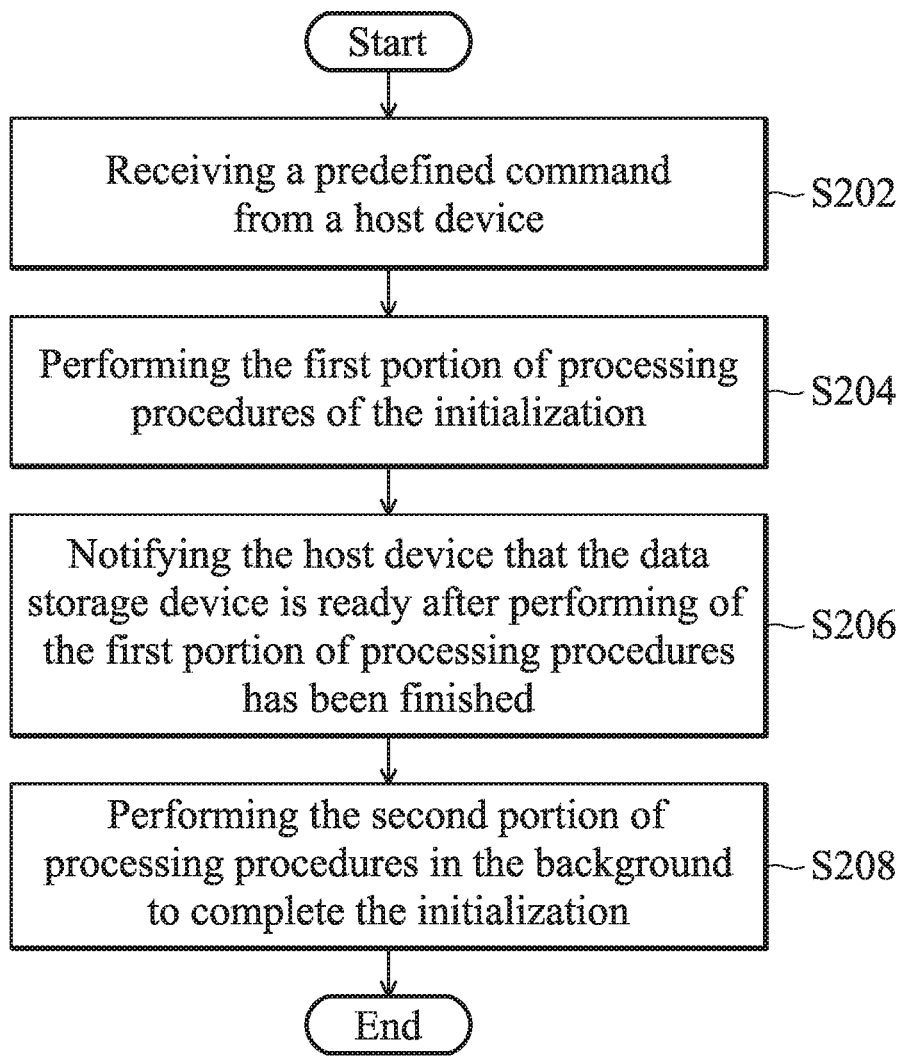
FIG. 2 is an exemplary flow chart of a data processing method according to an embodiment of the invention.

FIG. 2 is an exemplary flow chart of a data processing method according to an embodiment of the invention. First of all, the memory controller 110 receives a predefined command from the host device 130 (Step S202). The host device 130 issues the predefined command to instruct the memory controller 110 to perform initialization of the data storage device 100, so as to initialize the data storage device 100. Next, in response to the predefined command, the memory controller 110 starts to perform a first portion of processing procedures (Step S204). Next, after the memory controller 110 finishes the first portion of processing procedures, the memory controller 110 notifies the host device that the data storage device is ready (Step S206). Next, when the host device 130 is idle, the memory controller 110 performs the second portion of processing procedures in the background, so as to complete all the processing procedures required in the initialization of the data storage device 100 (Step S208).

According to an embodiment of the invention, the first portion of processing procedures comprises a procedure of scanning at least one of the table blocks to find the latest root table. Generally, the memory device 120 may comprise at least one system table memory block (hereinafter called the system table block for brevity), which is utilized to store a plurality of system tables. For example, one page of the system table block stores one system table. The system table may be a root table recording the corresponding addresses of all tables stored in the memory device 120, a wear leveling table recording the wear leveling value of each memory block, a VP table recording the number of valid page in each memory block, and so on.

Generally, every time when the memory controller 110 has to update the content of a system table, the memory controller 110 may write the updated content into an empty page of the system table block. Therefore, when the memory controller 110 wants to find the latest root table, the memory controller 110 may scan the system table block backward (that is in the direction that the page indices are decreasing) from the first empty page of the system table block, so as to find the latest and the valid root table. When the memory controller 110 is scanning the system table block, the memory controller 110 performs ECC checking on each page. When the memory controller 110 detects that there is one page storing some error that cannot be corrected by the ECC (that is, the Uncorrectable ECC Error or the UECC error), the page will be regarded as an invalid page and will be discarded. The memory controller 110 will keep scan backward until the latest and valid root table is found.

When the memory controller 110 finds the latest and valid root table, the memory controller 110 can obtain the location at which the tables are stored in the memory device 120 according to the content recorded in the root table. That is, the memory controller 110 can know in which page of which memory block the tables required for maintaining the operations of the data storage device 100 are stored. In this manner, the memory controller 110 may obtain the data that it needs from the corresponding table. According to an embodiment of the invention, the first portion of processing procedure may further comprise a procedure of loading the content of the latest root table into the buffer memory 116, such that the root table can be stored in the internal memory of the memory controller 110. This would be convenient for the memory controller 110 to update its content. When the initialization of the data storage device 100 is complete and when the data storage device 100 functions normally, the memory controller 110 can update the content of the root table (and also other tables) stored in the buffer memory 116 to the system table block (and also other table blocks corresponding to the other tables) in the memory device 120 at some specific time.

According to an embodiment of the invention, the first portion of processing procedures may further comprise a procedure of scanning at least one of the data blocks to establish a mapping table corresponding to the data block and store the mapping table in the buffer memory 116. To be more specific, the memory controller may obtain the address of an opened data block (that is, the memory block has not been fully written with data) by querying the corresponding table according to the content recorded in the aforementioned root table. Next, the memory controller 110 may scan the pages that have been written with data of the opened data block and read the content recorded in the corresponding spare region so as to know which logical page is data written in the corresponding physical page directed to. The memory controller 110 may further establish a mapping table according to the obtained information for this opened data block. According to an embodiment of the invention, the mapping table is a Flash to Host (F2H) mapping table recording which logical page is data written in the corresponding physical page of the data blocks directed to. For example, the mapping table may record the Logical Block Address (LBA) of the corresponding logical page or may record the logical address of the logical page in other ways.

Unlike a closed data block that has been fully written with data, since the content of an opened data block can still be updated, the mapping table of the opened data block is usually stored in the buffer memory 116. The memory controller 110 will update the content of the corresponding mapping table to the memory device 120 when this data block has been fully written with data or at some specific time. However, the buffer memory 116 cannot retain the data stored therein when the data storage device is powered off. Therefore, when the data storage device 100 is powered on again, the latest content of the mapping table corresponding to the opened data block may not be stored in the memory device 120. Therefore, in the initialization of the data storage device 100, the memory controller 110 may scan the opened data blocks to establish the corresponding mapping tables. It should be noted that in some embodiments of the invention, if the mapping table corresponding to an opened data block has been updated to the memory device 120, the memory controller 110 may also load the mapping table from the memory device 120 to the buffer memory 116 and then update content of this mapping table according to the information stored in the spare region of the opened data block, such that the mapping table records the latest mapping information.

According to an embodiment of the invention, when the memory controller 110 finds the latest and valid root table, obtains the addresses at which the tables are stored in the memory device 120 according to the content recorded in the root table and establishes the mapping table for the opened data block, the memory controller 110 can support access to the memory device 120 since the information required for supporting the access operations has been collected and established. Therefore, in the embodiments of the invention, the memory controller 110 may directly notify the host device 130 that the data storage device 100 is ready after the first portion of processing procedures has been finished. The reason why the memory controller 110 can notify the host device 130 that the data storage device 100 is ready before the initialization of the data storage device 100 is complete is that, when the host device 130 performs the subsequent system initialization after being notified that the data storage device 100 is ready, the host device 130 has to read the important system information first from the memory device 120, and will temporarily not perform the write or other operation on the memory device 120. Therefore, according to an embodiment of the invention, when the memory controller 110 has finished the processing procedures that are related to the abilities of supporting the read operations of the memory device 120, the memory controller 110 has the ability to support the read operations of the memory device 120. Therefore, the memory controller 110 can notify the host device 130 that the data storage device 100 is ready in advance before the initialization is complete. After that, the memory controller 110 can perform the second portion of processing procedures in the background.

According to an embodiment of the invention, the aforementioned "perform operations in the background" means that the operations are not performed in response to the commands issued by the host device 130, and/or the host device 130 will not be notified that the memory controller 110 is performing the operations. For not affecting the access operations of the host device 130, the memory controller 110 may determine to perform the second processing procedures in the background when determining that the host device is idle. According to an embodiment of the invention, the memory controller 110 may use a timer to count for a predetermined time period. If the host device 130 has not issued any command when the timer expires, it is determined that the host device 130 is now idle. After the timer expires, the memory controller 110 may perform the remaining second portion of processing procedures in the background.

According to an embodiment of the invention, the second portion of processing procedures may comprise a procedure of repairing one or more table blocks that have not been fully written with data and a procedure of repairing one or more data blocks that have not been fully written with data. For example, the table blocks that have not been fully written with data may comprise the table block storing the F2H mapping table, the table block storing the Host to Flash (H2F) mapping table, and the aforementioned system table block. The data blocks that have not been fully written with data may be the data block currently being used for receiving or buffering data from the host device, such as the aforementioned opened data block.

According to embodiment of the invention, in order to prevent the pages from being damaged when an Sudden Power Off (SPO) has occurred during a process of programming the memory device 120 and further affecting the subsequent programming operations, the memory controller 110 may repair the table blocks and the data blocks that have not been fully written with data.

According to an embodiment of the invention, the range of the pages that have to be repaired and the method adopted to repair the pages can be flexibly designed according to the physical characteristics of the memory device 120. The physical characteristics of the memory device 120 are usually specified in the specification of the corresponding product. For example, according to the physical characteristics of the memory device 120, when an SPO has occurred, in addition to the page being attacked by the SPO, which other pages that may also be damaged or affected by the SPO can be identified. For example, the pages that may also be damaged or affected by the SPO can be the pages corresponding to the word line group which is the same as the one being attacked by the SPO, the pages corresponding to one or more word lines that are adjacent to the word line corresponding to the page being attacked by the SPO, the pages having indices that are close to the index of the page being attacked by the SPO, the paired page of the page being attacked by the SPO, or others. In the second portion of processing procedures, the page being attacked or may possibly being attacked or affected by the SPO can be repaired by the memory controller 110.

According to an embodiment of the invention, the memory controller 110 may derive whether the memory device 120 has underwent an SPO attack and/or which page has been attacked by the SPO according to some specific determination rule. The specific determination rule may be, for example, whether an UECC page has been detected in an opened data block, whether an SPO flag or an SPO count indicates that an SPO has occurred, or it can be directly assumed that the previous power off is an SPO. The SPO count may be utilized to accumulate the number of occurrence of the SPO. When the SPO count increases, it means that the previous power off of the memory device 120 was caused by an SPO. In addition, the SPO flag may be utilized to indicate that whether the last power-off of the data storage device 100 was caused by the SPO. For example, when a value of the SPO flag is 1, it means that an SPO has occurred. When the value of the SPO flag is 0, it means that the last power-off of the memory device 120 was triggered by a normal power-off procedure. Every time that the data storage device 100 is powered up, the memory controller 110 may set the value of the SPO flag to 1 and store this value in the memory device 120. When the power-off of the memory device 120 was triggered by a normal power-off procedure, the memory controller 110 may set the value of the SPO flag to 0 during the normal power-off procedure and store this value in the memory device 120. Therefore, when the data storage device 100 is powered up again after an SPO, the value of the SPO flag will be 1. In addition, the memory controller 110 may directly assume that the page being attacked by the SPO is the last programmed page (non-empty page) of the opened data block, the first empty page of the opened data block, or may determine which page is attacked by the SPO according to whether an UECC page has been detected. For example, if the last non-empty page is an UECC page, it can be assumed that this page is the one being attacked by the SPO. If the last non-empty page is not an UECC page, it can be assumed that the first empty page is the one being attacked by the SPO.

According to an embodiment of the invention, the memory controller 110 may dummy program one or more empty pages of one or more table blocks that have not been fully written with data and one or more empty pages of one or more data blocks that have not been fully written with data. For example, the memory controller 110 may determine that the last non-empty page of an opened memory block is the one being attacked by the SPO based on the determination rules as discussed above and may further determine the locations of the other empty pages that may also be damaged or affected by the SPO according to the index of the page being attacked by the SPO and the physical characteristics of the memory device 120. Then, the memory controller 110 may double program the page being attacked by the SPO and dummy program the other empty pages that may also be damaged or affected by the SPO. Or, the memory controller may determine that the first empty page of an opened memory block is the one being attacked by the SPO based on the determination rules as discussed above and may further determine the locations of the other empty pages that may also be damaged or affected by the SPO according to the index of the page being attacked by the SPO and the physical characteristics of the memory device 120. Then, the memory controller 110 may dummy program the page being attacked by the SPO and the other empty pages that may also be damaged or affected by the SPO. According to an embodiment of the invention, the dummy program may be performed by writing predetermined invalid data into the target page, so as to destroy the target page. In this manner, the page being dummy programmed cannot be used anymore.

According to another embodiment of the invention, if the memory controller 110 performs one-shot programming to write data into the memory blocks, the memory controller may derive the location of the page being attacked by the SPO according to the specific determination rules as discussed above and may further determine the locations of the paired page that may also be damaged or affected by the SPO according to the index of the page being attacked by the SPO and the physical characteristics of the memory device 120. The memory controller 110 may double program the page being attacked by the SPO and its paired page. According to an embodiment of the invention, double program may be performed by writing the same data as the one that has been programmed into the corresponding page, so as to stabilize the data stored in the corresponding page. According to another embodiment of the invention, double program may also be performed by writing some predetermined invalid data to the corresponding page, so as to destroy the page.

According to yet another embodiment of the invention, the memory controller 110 may determine the location of the page being attacked by the SPO based on the determination rules as discussed above and may further determine the locations of the other empty pages that may also be damaged or affected by the SPO according to the index of the page being attacked by the SPO and the physical characteristics of the memory device 120. The memory controller 110 may further dummy program the other empty pages that may also be damaged or affected by the SPO and move the data stored in the non-empty pages (that is, the programmed pages) that may also be damaged or affected by the SPO to other empty pages. For example, the memory controller 110 may move the data to the empty pages in a next word line group.

According to yet another embodiment of the invention, the memory controller 110 may also determine to discard the page being attacked by the SPO and the non-empty pages that may also be damaged or affected by the SPO. For example, the memory controller 110 may eliminate the physical block and physical page links recorded in the H2F mapping table, thereby discarding the corresponding page. For example, the memory controller may rewrite the physical block and physical page links, corresponding to the page(s) to be destroyed, recorded in the H2F mapping table as "0xFF" or other default value or invalid value. In other words, once the link of a page in the H2F mapping table is eliminated, the data stored in the corresponding physical page will be regarded as invalid data.

It should be noted that in the embodiment of the invention, the repair operation may be flexibly designed according to the physical characteristic of the memory device 120, the type of the memory block (for example, an SLC, MLC or TLC block), the way to program the memory device (for example, whether the one-shot program is adopted), the extent of damage of the page (for example, whether an UECC page is detected), or others. The purpose of performing the repair operation is that by destroying the page being attacked by the SPO and other empty pages that may be damaged or affected by the SPO, and stabilizing the non-empty pages that may also be damaged or affected by the SPO (for example, by moving the data that is written in the non-empty pages to some other empty pages, or double program the non-empty pages to as to stabilize the non-empty pages), or destroying or discarding the non-empty pages that may also be damaged or affected by the SPO, the subsequent programming operation can be started from the pages that are stable and not affected by the SPO attack, to ensure that the data written in to the memory device in the subsequent programming operation will be correct.

Figure 3:
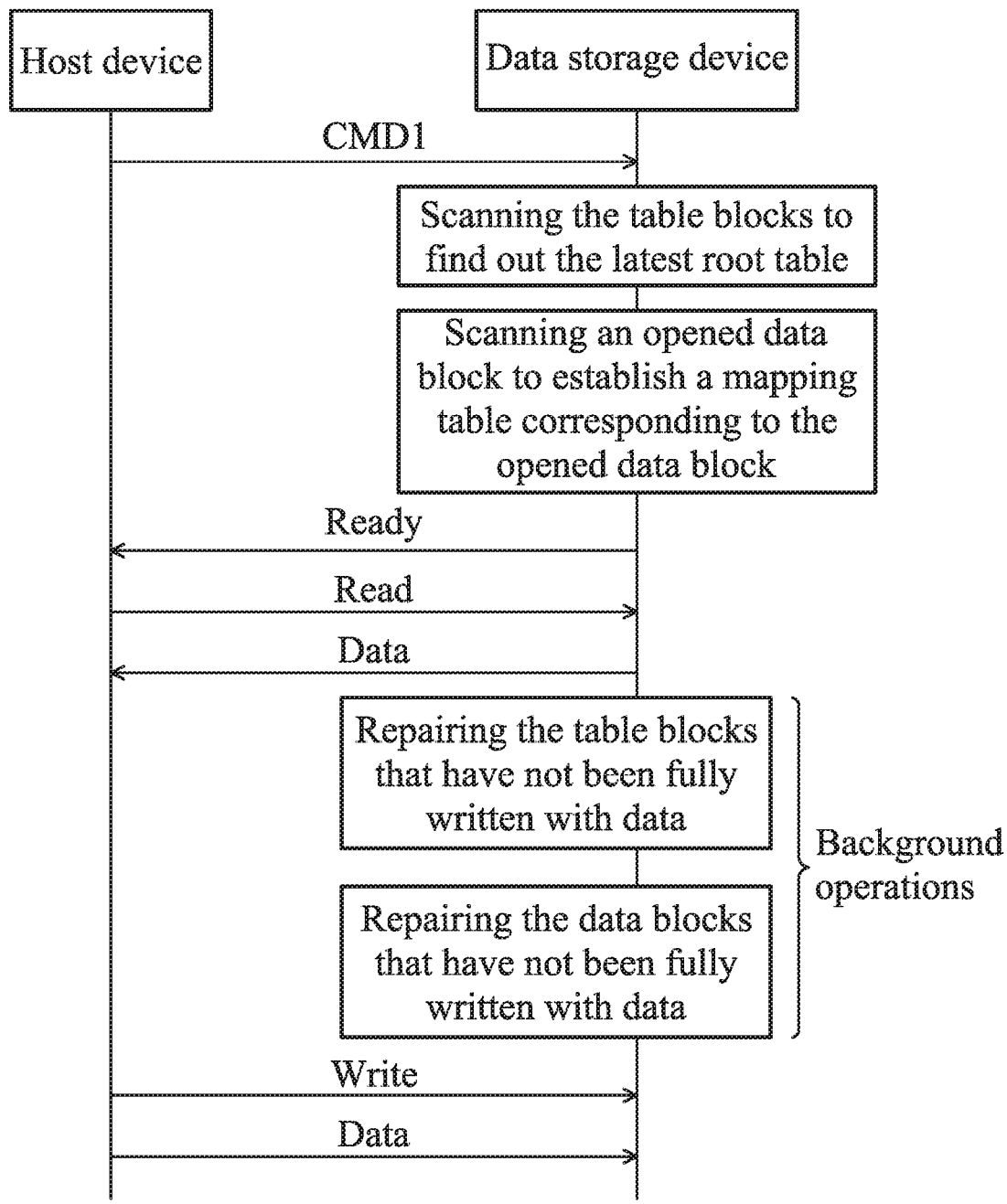
FIG. 3 shows an exemplary data processing flow chart according to an embodiment of the invention.

FIG. 3 shows an exemplary data processing flow chart according to an embodiment of the invention. In this embodiment, the data storage device 100 is an eMMC device. The host device 130 transmits a predefined command CMD1 to the data storage device 100, to instruct the memory controller 110 to perform initialization of the data storage device 100. In response to reception of the predefined command CMD1, the memory controller 110 starts to perform the first portion of processing procedures, which comprises a procedure of scanning at least one of the table blocks to find the latest root table and obtain address at which each table is stored in the memory device according to content recorded in the latest root table, and a procedure of scanning at least one opened data block to establish a mapping table corresponding to the data block. After the memory controller 110 has finished performing the aforementioned procedures, the memory controller 110 may respond to the host device 130 with a ready message Ready to notify the host device 130 that the data storage device 100 is ready. When the host device 130 is notified that the data storage device 100 is ready, the host device 130 can start to access the memory device by issuing the read command Read for reading the data Data from the memory device.

Thereafter, when the memory controller 110 determines that the host device 130 is idle, the memory controller 110 starts to perform the second portion of processing procedures, which comprises a procedure of repairing one or more table blocks that have not been fully written with data and a procedure of repairing one or more data blocks that have not been fully written with data, in the background, so as to complete the initialization of the data storage device 100. Generally, after obtaining important system information by reading the memory device 120, the host device 130 performs the subsequent system initialization, such as initializing the peripheral devices, starting up the OS, etc. Therefore, the memory controller 110 is able to perform the aforementioned repair operations during the time period in the background when the host device 130 is idle (that is, when the host device 130 does not have to access the memory device 120). It should be noted that in other embodiments of the invention, the memory controller 110 may also repair the data blocks that have not been fully written with data first, and then repair the table blocks that have not been fully written with data. Therefore, the invention should not be limited to the execution order as shown in FIG. 3. In the embodiment of the invention, at the time when the host device 130 issues the write command Write, the memory controller 110 has already finished the repair operations and thus the data Data can be written into the safe and stable empty pages.

Figure 4:
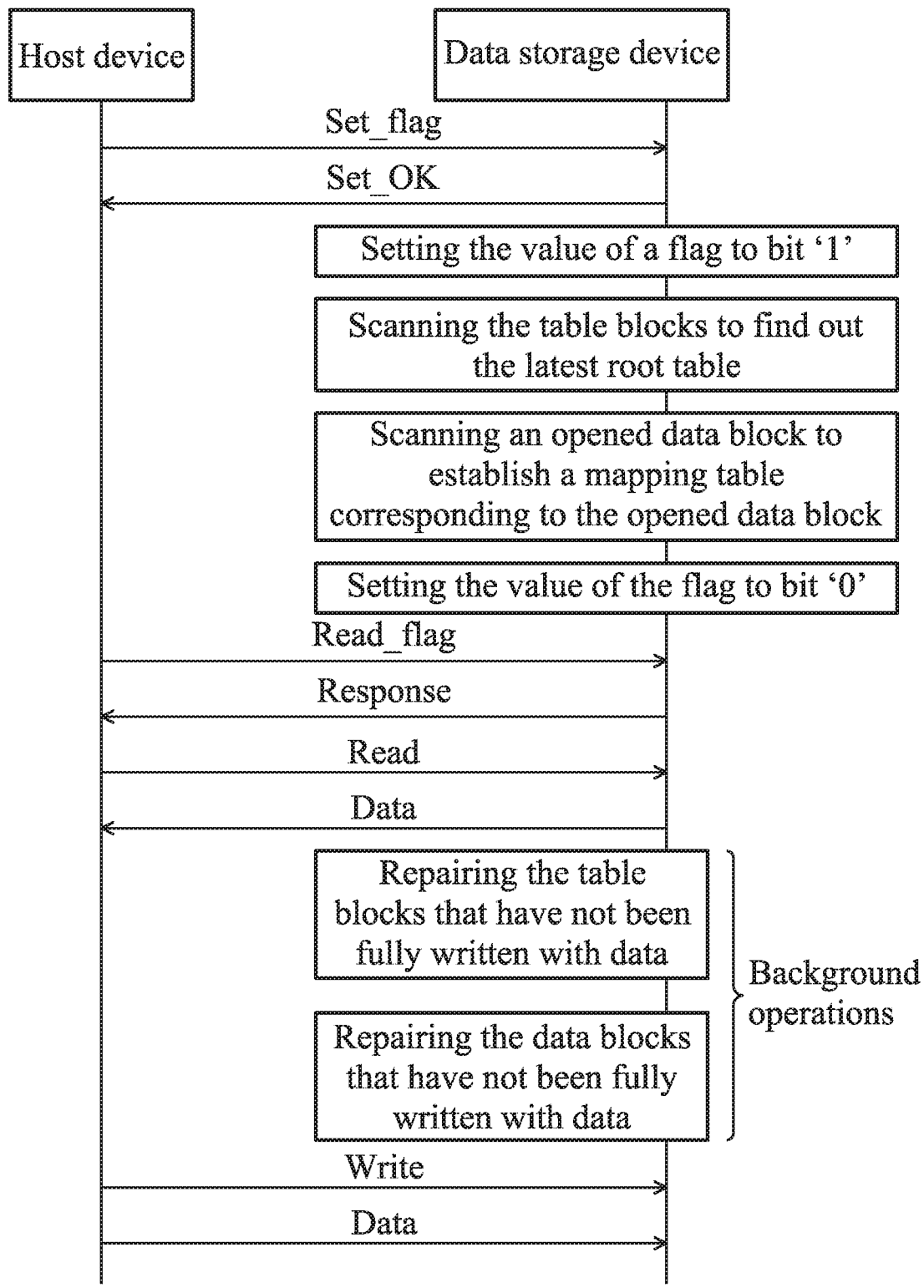
FIG. 4 shows another exemplary data processing flow chart according to another embodiment of the invention.

FIG. 4 shows another exemplary data processing flow chart according to another embodiment of the invention. In this embodiment, the data storage device 100 is an UFS device. The host device 130 transmits a predefined command Set_flag to the data storage device 100, so as to set the value of the flag to bit '1' to instruct the memory controller 110 to perform initialization of the data storage device 100. The value of the flag may be stored in a register of the data storage device 100 (in some embodiment of the invention, the value of the flag may also maintained in a register at the host device 130 side). In response to reception of the predefined command Set_flag, the memory controller 110 sets the value of the flag to bit '1' and responds to the host device 130 with a set complete message Set_OK. In addition, in response to reception of the predefined command Set_flag, the memory controller 110 starts to perform the first portion of processing procedures, which comprises a procedure of scanning at least one of the table blocks to find the latest root table and obtain address at which each table is stored in the memory device according to content recorded in the latest root table, and a procedure of scanning at least one opened data block to establish a mapping table corresponding to the data block. After the memory controller 110 has finished performing the aforementioned procedures, the memory controller 110 sets the value of the flag to bit '0' to notify the host device 130 that the data storage device 100 is ready. After the host device 130 sends the predefined command Set_flag, the host device 130 may keep polling the value of the flag by issuing query requests. For example, the host device 130 may query the current value of the flag by issuing a read flag command Read_flag to the data storage device 100. In response to the read flag command Read_flag, the data storage device 100 may respond to the host device 130 with a query response message Response to reply the current value of the flag to the host device 130. The host device 130 knows that the data storage device 100 is ready when it detects that the value of this flag is set to the bit '0'. When the host device 130 knows that the data storage device 100 is ready, the host device 130 can start to access the memory device by issuing the read command Read for reading the data Data from the memory device.

Thereafter, when the memory controller 110 determines that the host device 130 is idle, the memory controller 110 starts to perform the second portion of processing procedures, which comprises a procedure of repairing one or more table blocks that have not been fully written with data and a procedure of repairing one or more data blocks that have not been fully written with data, in the background, so as to complete the initialization of the data storage device 100. As discussed above, after obtaining important system information by reading the memory device 120, the host device 130 performs the subsequent system initialization, such as initializing the peripheral devices, starting up the OS, etc. Therefore, the memory controller 110 is able to perform the aforementioned repair operations in the background during the time period when the host device 130 is idle (that is, when the host device 130 does not have to access the memory device 120). It should be noted that in other embodiments of the invention, the memory controller 110 may also repair the data blocks that have not been fully written with data first, and then repair the table blocks that have not been fully written with data. Therefore, the invention should not be limited to the execution order as shown in FIG. 4. In the embodiment of the invention, at the time when the host device 130 issues the write command Write, the memory controller 110 has already finished the repair operations and thus the data Data can be written into the safe and stable empty pages.

As discussed above, by applying the proposed data processing method and using the data storage device executing the proposed data processing method, the time required for a host device to wait for the initialization of the data storage device can be greatly shortened. In this manner, the host device 130 is able to access the data storage device 100 much earlier than the conventional design, and the overall initialization efficiency of the host device or an electronic device including the host device can be greatly improved. In addition, since the data storage device notifies the host device that the data storage device is ready after completing only a partial initialization, and the data storage device can support the read operation for the host device after the partial initialization is completed, the host device will not consider the initialization of the data storage device to have failed due to the reason that the time required for the data storage device to initialize has exceeded an expected value or the host device cannot be notified that the data storage device is ready within a preset time period. Therefore, for the case when the data storage device has to take more time to initialize (for example, the time required for initialization may be increased as the memory size increases), by applying the proposed data processing method, not only the initialization efficiency of the entire electronic device system can be improved, but also the problem of initialization overtime, which may cause the host device to consider that the data storage device is off-line or consider that the initialization of the data storage device has failed, can be solved.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
   a memory device, comprising a plurality of memory blocks, wherein the memory blocks comprise a plurality of table blocks configured to store a plurality of tables and a plurality of data blocks configured to store data; and
   a memory controller, coupled to the memory device and configured to access the memory device,
   wherein the memory controller is configured to receive a predefined command which is a command from a host device to instruct the memory controller to perform initialization of the data storage device, the initialization of the data storage device comprises a plurality of processing procedures, the processing procedures comprise a first portion of processing procedures and a second portion of processing procedures, the memory controller is configured to perform the first portion of processing procedures in response to the predefined command, and after the first portion of processing procedures has been finished and before the second portion of processing procedures has been finished, the memory controller is configured to notify the host device that the data storage device is ready.

2. The data storage device as claimed in claim 1, wherein the memory controller notifies the host device that the data storage device is ready by responding to the host device with a ready message.

3. The data storage device as claimed in claim 1, wherein the memory controller notifies the host device that the data storage device is ready by setting a value of a flag to a predefined value.

4. The data storage device as claimed in claim 1, wherein after notifying the host device that the data storage device is ready, the memory controller is further configured to determine whether the host device is idle, and when the host device is idle, the memory controller is configured to perform the second portion of processing procedures, so as to complete the initialization of the data storage device.

5. The data storage device as claimed in claim 1, wherein the first portion of processing procedures comprises a procedure of scanning at least one of the table blocks to find a latest root table, and the memory controller is configured to obtain addresses at which the tables are stored in the memory device according to content recorded in the latest root table.

6. The data storage device as claimed in claim 1, wherein the first portion of processing procedures comprises a procedure of scanning at least one of the data blocks to establish a mapping table corresponding to the at least one data block, wherein the mapping table records which logical page is data written in each physical page of the at least one data block directed to.

7. The data storage device as claimed in claim 4, wherein the second portion of processing procedures comprises a procedure of repairing one or more table blocks that have not been fully written with data.

8. The data storage device as claimed in claim 4, wherein the second portion of processing procedures comprises a procedure of repairing one or more data blocks that have not been fully written with data.

9. A data processing method for a data storage device, wherein the data storage device comprises a memory device and a memory controller, the memory device comprises a plurality of memory blocks, the memory blocks comprise a plurality of table blocks configured to store a plurality of tables and a plurality of data blocks configured to store data, the memory controller is coupled to the memory device and is configured to access the memory device, and the method is performed by the memory controller and comprises:
   receiving a predefined command from a host device to instruct the memory controller to perform initialization of the data storage device, wherein the initialization of the data storage device comprises a plurality of processing procedures, and the processing procedures comprise a first portion of processing procedures and a second portion of processing procedures;

performing the first portion of processing procedures in response to the predefined command; and notifying the host device that the data storage device is ready after the first portion of processing procedures has been finished and before the second portion of processing procedures has been finished.

10. The data processing method as claimed in claim 9, wherein the step of notifying the host device that the data storage device is ready after the first portion of processing procedures has been finished further comprises:

notifying the host device that the data storage device is ready by responding to the host device with a ready message.

11. The data processing method as claimed in claim 9, wherein the step of notifying the host device that the data storage device is ready after the first portion of processing procedures has been finished further comprises:

notifying the host device that the data storage device is ready by setting a value of a flag to a predefined value.

12. The data processing method as claimed in claim 9, further comprising:

determining whether the host device is idle after notifying the host device that the data storage device is ready; and performing the second portion of processing procedures when the host device is idle, so as to complete the initialization of the data storage device.

13. The data processing method as claimed in claim 9, wherein the step of performing the first portion of processing procedures in response to the predefined command further comprises:

scanning at least one of the table blocks to find a latest root table; and obtaining addresses at which the tables are stored in the memory device according to content recorded in the latest root table.

14. The data processing method as claimed in claim 9, wherein the step of performing the first portion of processing procedures in response to the predefined command further comprises:

scanning at least one of the data blocks to establish a mapping table corresponding to the at least one data block, wherein the mapping table records which logical page is data written in each physical page of the at least one data block directed to.

15. The data processing method as claimed in claim 12, wherein the step of performing the second portion of processing procedures when the host device is idle further comprises:

repairing one or more table blocks that have not been fully written with data.

16. The data processing method as claimed in claim 12, wherein the step of performing the second portion of processing procedures when the host device is idle further comprises:

repairing one or more data blocks that have not been fully written with data.

* * * * *